Patented Feb. 4, 1941

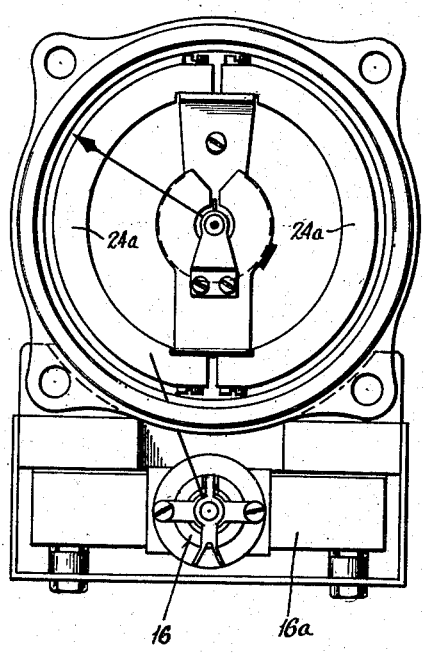
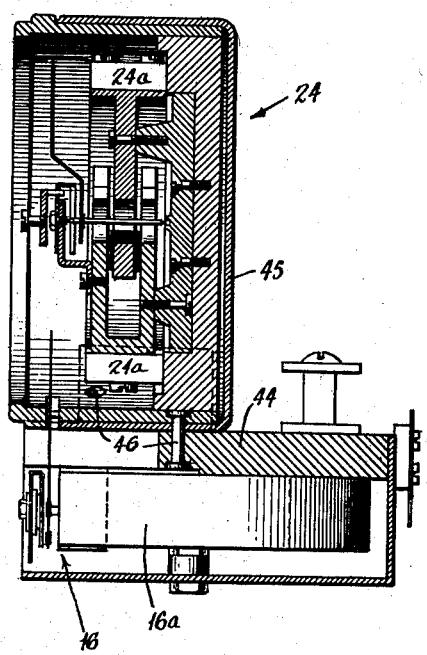

2,230,779

UNITED STATES PATENT OFFICE 2,230,779

PYROMETER POTENTIOMETER

Manfred J. Johnson, Naugatuck, Conn., assignor to The Lewis Engineering Company, Naugatuck, Conn., a corporation of Connecticut Application May 26, 1937, Serial No. 144,771

5 Claims. (Cl. 73—361)

This invention relates to potentiometer systems, and more particularly to the pyrometer type of instrument for indicating the value of unknown quantities such as temperatures by measuring voltages in thermocouples set up by and varying with said temperatures.

An object of the invention is to provide a pyrometer type potentiometer having improved means for compensating for variations in temperature of the cold junction of the thermocouple, so that an accurate reading is given at all times over a wide range of cold junction temperatures, and so that accurate compensation can be had for various types of thermocouples, the adjustment to any one type being quickly and easily effected.

This object is attained by a system wherein a resistance bridge is energized from an unvarying but adjustable source, and is connected in the thermocouple circuit, the current passing through the bridge being standardized for the various couples which might be employed. Also, the bridge is provided with legs of positive temperature coefficient of resistance and legs of negative temperature coefficient of resistance such that a relatively great difference in unbalance is obtained per degree change in temperature, and according to this system, there is also a comparatively small current required of the battery energizing the bridge, and therefore this battery will remain serviceable and give constant and unvarying energy over long periods.

Moreover, by providing a bridge having legs of opposite temperature coefficient of resistance, the overall resistance of the bridge can be reduced, and this reduces the series resistance in the galvanometer circuit and makes for more sensitivity of the instrument and greater accuracy in readings.

Another object of the invention is to provide a pyrometer potentiometer with cold-junction compensation accurate over a wide range wherein the accuracy of said compensation can be checked and adjusted quickly and without trouble or disturbance to the readings of the indicating instrument.

In accomplishing this object a system is used wherein the galvanometer or zero-deflection instrument of the potentiometer is connected to be transferred to the separately energized compensating circuit and used as a milliammeter to indicate the proper value of current to be used in energizing the compensating bridge, the arrangement being such that the circuit of the main deflection instrument, and consequently the reading of said instrument, is not disturbed during this adjustment, because the switching of the galvanometer is effected in a separate part of the potentiometer circuit. According to the arrangement employed, provision is made for minimizing the effects of ambient temperature on the galvanometer when the latter is being employed as a milliammeter, by providing a switch and shunting resistance assembly of material having temperature coefficients similar to that of the material of the galvanometer.

In attaining extreme accuracy of readings over a wide range of ambient temperatures, the invention provides a potentiometer, incorporating both an indicating instrument and a zero-deflection instrument reading on one dial, wherein both of said instruments are fabricated into a single unit, in such a manner that expansion and contraction of the structure due to temperature changes will not affect the readings.

Also, the system of the present invention includes a main indicating instrument which is series-connected in its circuit without any shunts, and a calibrating resistor for said instrument which need not have the same temperature-resistance characteristics as the metal parts of the instrument, so that high reading accuracy is obtained over a wide range of change in temperature. Because of the true series circuit through the instrument, changes in temperature of the coil thereof will not affect the readings. Changes which the springs and magnet of the instrument undergo with change of temperature are offset in the design and construction so that they counterbalance each other.

Another object of the invention is to provide a pyrometer potentiometer of extreme accuracy as above set forth which is also comparatively simple in construction and of small dimension so that it can be economically manufactured and readily transported when in use.

Other features and advantages will hereinafter appear.

In the accompanying drawings:

Fig. 3 is a face view with dial removed of the combination instrument, and

Fig. 4 is a vertical section of the instrument of Fig. 3.

Figure 1:
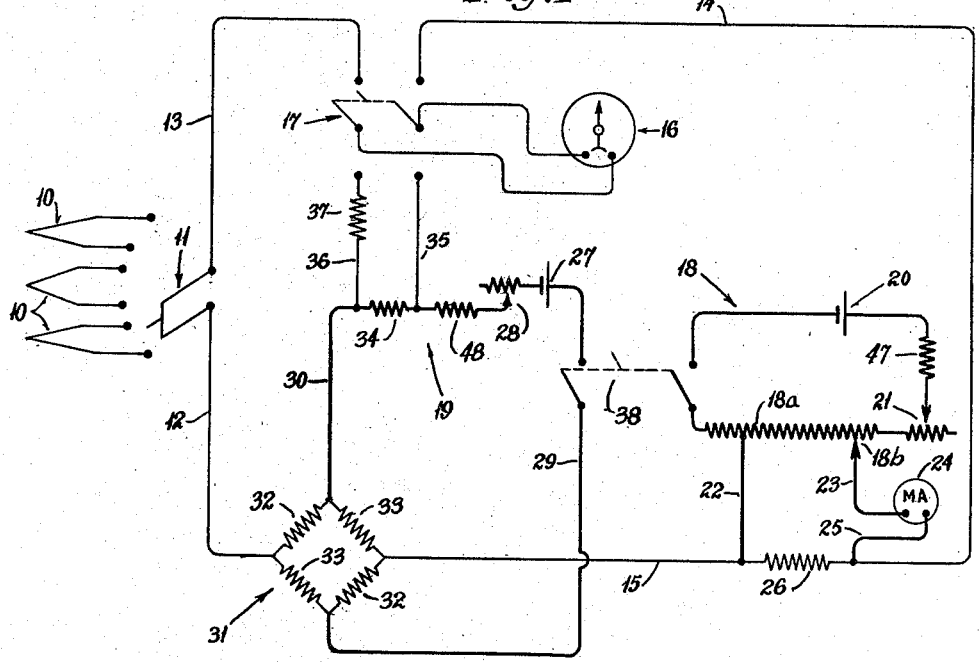
Figure 1 is a schematic diagram of the potentiometer system of the invention.

Referring to Figure 1, the potentiometer system of this invention is shown having a plurality of thermocouples 10, any one of which may be connected in the circuit by means of a selector switch 11 so that its temperature can be measured. The switch 11 is connected to the wires 12 and 13 of an opposition circuit, which circuit also includes the wires 14 and 15. A galvanometer or other suitable deflection instrument 16 is connected in said circuit through a switch 17 so that the voltage opposing the thermocouple E. M. F. may be adjusted to exactly counterbalance the latter by the zero-deflection method, the instrument 16 indicating the correct adjustment when its deflection is zero as a result of dying of the current in the circuit.

According to the present invention there is provided an improved system introducing in the opposition circuit a voltage which is adjustable to exactly counterbalance that of a thermocouple 10, and improved means for compensating for changes in temperature of the cold junction of said thermocouple over a wide range of values, and for various types of couples. This system comprises a principal circuit, broadly designated by the numeral 18, for introducing E. M. F., and a second circuit 19, separately energized from an unvarying but adjustable source, compensating for temperature variations of the cold junction.

The circuit 18 includes a slide wire 18a, the ends of which are connected to a battery 20, and, for the purpose of adjusting the value of current through the slide wire, includes a rheostat 21 in the battery circuit. A tap is taken from the slide wire 18a and connected by a lead 22 to the wire 15 of the opposition circuit, and the slider 18b of the slide wire is connected by a lead 23 to a current-measuring instrument or milliammeter 24 which is connected by another lead 25 to the wire 14 of the circuit. Thus, a voltage is introduced up in the circuit 12, 13, 14, 15, which opposes the thermocouple E. M. F., said voltage being adjustable by varying the slider 18b. The wires 14 and 15 are connected to a resistor 26 so that the voltage drop therethrough constitutes this opposing voltage, and this resistor also functions as a calibrating means for the instrument 24, and preferably has a value such that the instrument 24 is calibrated to read the millivolts of the couples 10.

According to the invention, the circuit 19 is energized to carry predetermined adjusted values of unvarying current, to accurately compensate, over a wide range, for cold junctions of various types of couples, and said circuit has a separate battery 27 connected to an adjusting rheostat 28, the battery and rheostat being connected through wires 29 and 30 to opposite corners of a compensating bridge 31, which bridge is in turn connected at its other corners to the wires 12 and 15 of the balancing circuit.

In carrying out the invention the compensating bridge 31 is provided with two pairs of oppositely disposed resistors 32 and 33 serving as legs, and series-connected in a diamond, as shown, the resistors 32 being of a material having a negative temperature coefficient of resistance, and the resistors 33 being of a material having a positive temperature coefficient of resistance. It is at present preferred to make the resistors 32 of a carborundum material, and the resistors 33 of nickel. The bridge current is adjusted to give the same voltage change as the cold junction E. M. F. change of the thermocouple, per degree change in temperature. That is, when the temperature of the bridge 31 and cold junction of the thermocouple change, the drop across said bridge between the wires 12 and 15 will change in a manner to compensate for the change in E. M. F. of the cold junction due to said temperature change. Also, I have found that by providing a bridge having one pair of legs of negative temperature coefficient of resistance and the other pair of legs of positive temperature coefficient of resistance, the difference in unbalance in the bridge per degree change in temperature is much greater than if the bridge did not have negative coefficient legs, and the compensation for variations of temperature is accomplished with the bridge operating on less current from the battery 27, and therefore said battery will give more uniform and accurate service, and will last longer in use.

By using legs of negative temperature coefficient of resistance it is possible to make the resistance of the bridge lower, for satisfactory operation, than if the bridge had no such legs. This is an important advantage since the amount of resistance in series with the galvanometer and thermocouple affects the sensitivity of the galvanometer. The more resistance there is in the galvanometer circuit, the more will the deflection of the instrument be cut down, and therefore the less accurate the instrument will be, and the less accurate the readings of the indicating instrument 24 will be. For this reason, the galvanometer is of medium-low resistance, approximately 6 ohms, and the bridge resistance is kept as low as possible. Thus a double-pivot type of galvanometer may be used, which is extremely rugged, and adapted for use in places of strong vibration, and this instrument will be accurate on low scale ranges because of the comparatively small resistance in its circuit.

Due to the favorable relation between the thermocouple and the galvanometer resistance made possible by this circuit, together with the accurate cold-junction compensation, low scale ranges of readings are possible, such as between zero and 100° Fahrenheit while still retaining the ruggedly constructed type of instruments. It will be seen that the indicating instrument 24 may be of comparatively heavy and rugged construction since it is operated by hundreds of times the power that the thermocouples 10 are capable of supplying.

There is also provided in the potentiometer system of this invention a simple and effective means for checking and adjusting the current through the compensating bridge whereby the current can be held constant at predetermined adjusted values, so that the bridge will accurately compensate for temperature variations of the cold juncture, this means including the galvanometer 16, and operating in such a manner that the circuit and reading of the main deflection instrument 24 will not be disturbed.

As shown, the circuit 19 is provided with a resistor 34 series-connected with the rheostat 28, the voltage drop across said resistor varying with the value of current in the circuit. The resistor 34 is adapted to function as a shunt for the galvanometer 16, and therefore said resistor is connected by wires 35 and 36 through a calibrating resistance 37 to the switch 17 so that throwing of said switch will connect the galvanometer across the shunt. This circuit for checking the compensating current through the bridge is corrected for different ambient temperatures; that is, the shunt 34 and calibrating resistor 37 are made with the same temperature coefficient as the galvanometer 16, so that changes in ambient temperature will not affect the accuracy of the check.

The galvanometer 16 is calibrated by means of the resistor 37, so that during operation of the potentiometer a quick check may be had of the current through the compensating bridge 31; in effecting this calibration the procedure is to first adjust the compensating rheostat 28 for the particular battery 27 employed until the bridge 31 is carrying the proper current to correctly compensate for temperature changes of the cold junction, for the particular type of couple used. That is, the bridge current is adjusted to give the same drop voltage change per degree change in temperature as the E. M. F. change in the cold junction of the thermocouple. Then the switch 17 is thrown to the lower position to connect the galvanometer, and the value of the resistor 37 varied until a substantial scale deflection of the galvanometer from its zero position results. This point is marked on the scale, see Fig. 2, and characterized by the letters "CH." The calibrating resistor 37 is kept at this value permanently, so that the proper bridge current can now be checked with the galvanometer. Adjustment of this compensating current of the bridge, to its proper value, such adjustment being necessary because of changes in the condition of the cell, etc., is now effected by operating the compensating rheostat 28, and the proper value can be rapidly and easily determined by connecting the galvanometer to the bridge circuit through the switch 17 and adjusting the rheostat until the galvanometer pointer is on the mark "CH."

According to the system of this invention, it is possible to adjust the compensating current through the bridge for various types of thermoelectric couples. Thus, if the couple used in determining the point "CH" on the scale is iron-constantan, and it is desired also to compensate for copper-constantan thermocouples, a different compensating current would be used, and this could be obtained by adjusting the compensating rheostat 28, resulting in a different deflection of the galvanometer. When the proper value of compensating current for the copper-constantan couple is obtained, a second check mark is made on the galvanometer scale, as indicated by the new position of the needle, and this mark is further characterized by the letters "CC," denoting copper-constantan, see Fig. 2. Thus any number of different types of thermocouples may be compensated for by varying the rheostat 28 to bring the galvanometer pointer to predetermined marked positions on the dial. The scale of the instrument 24 may be provided with different calibrations for the different couples employed, or a conversion chart may be used if only one calibrated scale is provided for the indicating instrument.

The circuits 18 and 19 are provided with switching means to disconnect the batteries when the potentiometer is not in use, and preferably this means comprises a double pole single throw switch 38 connected as shown, so that both circuits may be opened or closed with a single operation.

In using the potentiometer, the selector switch 11 is thrown to connect in the circuit the particular thermocouple 10 whose temperature is to be measured. The switch 38 is closed so that the circuits 18 and 19 are energized, and the switch 17 thrown to the lower position to connect the galvanometer 16 for checking the compensating current. The compensating rheostat 28 is adjusted until the galvanometer needle rests on the point marked "CH" (check), for the type of couple used, and the switch 17 then thrown to the upper position to include the galvanometer in the potentiometer circuit. The slide wire 18b is then adjusted until the galvanometer shows no deflection, signifying that the opposing voltages are balancing each other, whereupon the indicating instrument 24 is read. This instrument responds to the value of the current flowing in the wires 23 and 25, and can, if desired, be calibrated in milliamperes. However, since the current through the instrument is dependent on the E. M. F. and temperature of the thermocouples 10, it is preferably calibrated in millivolts, and also in degrees Fahrenheit, as shown in Fig. 2.

Figure 2:
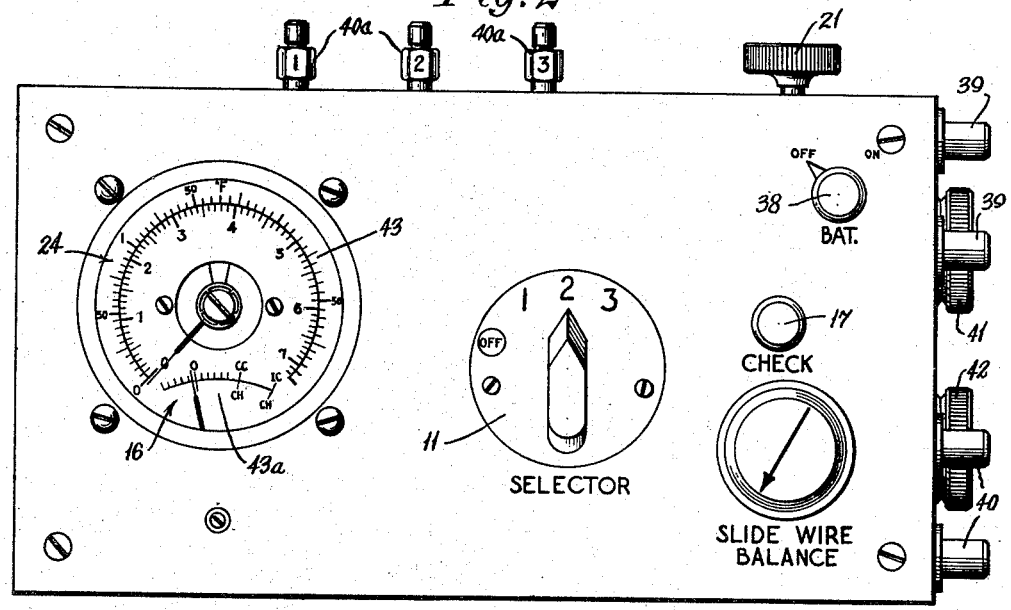
Fig. 2 is a top or panel view of the assembled potentiometer.

In Figs. 2, 3 and 4, the instruments and assembly of the present potentiometer are shown. Fig. 2 shows a panel or top view. The selector switch 11 is located substantially centrally in the panel, with the indicating instrument 24 and galvanometer 16 placed to the left. The slide wire control is in the lower right hand corner, and above this are located the check switch 17 and battery switch 38. At the right side of the cabinet are shown terminal posts 39 for connection to the battery 20, and terminal posts 40 for connection to the battery 27, should these batteries be external of the cabinet. Provision is made for batteries to be carried within the cabinet, and for this purpose the right end thereof has a pair of jars or containers 41 and 42 each to receive a flashlight battery, the battery in the jar 41, constituting the battery 20, and the battery in the jar 42 constituting the battery 27 in the circuit. If these flashlight batteries are used, no external batteries need be connected with the terminals 39 or 40.

Connections are made of the thermocouples through the standard Navy-type connectors 40a shown at the upper side of the cabinet, said connectors joining with the points 1, 2 and 3, respectively of the switch 11. Also located on the upper side of the cabinet is the slide wire rheostat 21.

In indicating extremely accurate readings, the potentiometer of this invention employs a combination indicating and balancing instrument, shown in Figs. 2, 3 and 4, comprising a tachometer type movement in the milliammeter 24, reading on a 270° dial 43, said movement being of the usual type having permanent magnets 24a, and the galvanometer movement 16 reading on the lower portion 43a of said dial, and having a permanent magnet 16a. In order that these instruments, which both read on a single dial, are accurate throughout a wide range of temperatures, they are structurally joined into a single unit in such a manner that expansion and contraction of materials will not alter or affect readings.

Referring to Figs. 3 and 4, it will be seen that the galvanometer movement 16 and magnet 16a are secured directly to a horizontal plate 44 which is attached to the casing 45 of the instrument 24 by rivets 46, said casing carrying the tachometer movement and magnets so that no possible distortion of the structure could result to throw out the reading. The importance of this feature will be appreciated when it is considered that these instruments are subjected to extremely cold temperatures in aircraft use. Furthermore, the accuracy of the readings is not affected by any changes in the leakage flux between the premanent magnet of the galvanometer and that of the milliammeter. If the magnets of these instruments were not rigidly connected by a short and sturdy structure, extreme temperatures would change their relative positions and cause a corresponding change in leakage flux which would adversely affect the readings.

Referring again to Fig. 1, the circuits 18 and 19 are provided with safety current limiting resistors 47 and 48 respectively, in series therewith, so that excessive drain from the batteries 20 and 27 is prevented should the controlling rheostats for these circuits be inadvertently turned to cut out all their resistance.

Variations and modificatons may be made within the scope of this invention and portions of the improvements may be used without others.

I claim:

1. In a pyrometer of the potentiometer type, a circuit, including a galvanometer, and means for connecting one of a plurality of thermocouples thereto; a compensating bridge resistance in said circuit, the unbalance of which bridge varies with changes in the temperature of the cold end of the couple, to compensate for E. M. F. variation of said cold end; a source of energy connected to said bridge; means for supplying a voltage in said circuit opposing the E. M. F. of the couple, including a second source of energy, means for varying the impressed voltage of said second source, and an indicating device in series therewith, responding to the current delivered thereby in counterbalancing the E. M. F. of the couple to indicate the temperature of said couple; and means for switching the galvanometer from the potentiometer circuit wherein it indicates the condition of balance to the bridge-energizing circuit wherein it functions as an ammeter so that the current flowing therein can be measured and brought to the proper value for the cold end compensation of the bridge for the thermocouple used therewith.

2. In a pyrometer of the potentiometer type, a balancing circuit, including a galvanometer, means for selectively connecting said circuit to one of a plurality of theremocouples, and a source of voltage opposing the. couple E. M. F.; means in said circuit for controlling said voltage for measuring the temperature of the couple; a compensating bridge resistance in said circuit, the degree of unbalance of which bridge varies with the changes in temperature of the cold end; means including a separate source of E. M. F. connected to said bridge and means for regulating the E. M. F. impressed on the bridge to compensate for the E. M. F. at the cold end of the couple; and means for switching the galvanometer from the balancing circuit to the bridge energizing circuit so that the current flowing therein can be measured and regulated for obtaining proper compensation of the couple selectively connected in the circuit, the compensating being performed independently of the balancing circuit.

3. In a pyrometer of the potentiometer type, a balancing circuit including a galvanometer having a pair of scales thereon, one for indicating the balance condition of the balancing circuit, and the other a current-measuring scale; means selectively connecting said circuit to one of a plurality of thermocouples; a source of voltage in said circuit opposing the couple E. M. F.; means in said circuit for controlling said voltage for measuring the temperature of the couple; a compensating resistance bridge in said circuit, the degree of unbalance of which varies with changes of temperature of the cold end; a compensating circuit separate from the balancing circuit and including a separate source of E. M. F. connected to said bridge; means for regulating the E. M. F. impressed on the bridge to compensate for the E. M. F. in the cold end of the couple selectively connected in the balancing circuit; and means for switching the galvanometer from the balancing circuit to the compensating circuit so that the current flow therein can be measured and regulated to obtain a proper compensating current for the couple selectively connected in the circuit, the compensation being performed independently of the balancing circuit.

4. The invention as defined in claim 2 wherein the compensating bridge resistance comprises one pair of legs of positive temperature coefficients and the other pair of legs of negative temperature coefficients to form a compensating resistance of low value whereby the sensitivity of the galvanometer and means for measuring the temperature are not impaired when in the circuit therewith.

5. The invention as defined in claim 2 wherein there is common means in the circuits of each of said separate sources of voltage for simultaneous controlling both of said circuits.

MANFRED J. JOHNSON.